(12) United States Patent
Palmer (10) Patent No.: US 10,087,115 B2
(45) Date of Patent: Oct. 2, 2018

(54) ORGANIC WASTE PROCESSING

(71) Applicant: ELEMENTAL DIGEST LIMITED, Exeter Devon (GB)

(72) Inventor: Bruce William Palmer, Somerset (GB)

(73) Assignee: Elemental Digital Limited, Exeter Devon (GB)

( * ) Notice: Subject to any disclaimer, the term of this patent is extended or adjusted under 35 U.S.C. 154(b) by 3 days.

(21) Appl. No.: 14/900,337

(22) PCT Filed: Jun. 19, 2014

(86) PCT No.: PCT/GB2014/051883
§ 371 (c)(1),
(2) Date: Dec. 21, 2015

(87) PCT Pub. No.: WO2014/202986
PCT Pub. Date: Dec. 24, 2014

(65) Prior Publication Data
US 2016/0145164 A1 May 26, 2016

(30) Foreign Application Priority Data

Jun. 21, 2013 (GB) .................................. 1311108.3
Dec. 23, 2013 (GB) .................................. 1322874.7

(51) Int. Cl.
*C05F 1/00* (2006.01)
*C05F 9/00* (2006.01)
(Continued)

(52) U.S. Cl.
CPC ............. *C05G 3/0094* (2013.01); *C05D 3/02* (2013.01); *C05F 1/005* (2013.01); *C05F 3/00* (2013.01);
(Continued)

(58) Field of Classification Search
None
See application file for complete search history.

(56) References Cited

U.S. PATENT DOCUMENTS 4,743,287 A * 5/1988 Robinson .................. C05F 3/00
 71/12
5,411,567 A * 5/1995 Ueotani .................... C05F 3/00
 435/101

(Continued)

FOREIGN PATENT DOCUMENTS

CN 101298397 6/2008
WO 1995/29884 11/1995
(Continued)

OTHER PUBLICATIONS

International Search Report for parent case, App. No. PCT/GB2014/051883, dated Dec. 24, 2014.
Database WPI, XP002730148 and XP002730149, Nov. 5, 2008.

*Primary Examiner* — Wayne Langel
(74) *Attorney, Agent, or Firm* — Boulware & Valoir (57) ABSTRACT

The present invention relates to methods of processing organic waste, in particular it relates to a method for making fertilizer from organic waste, especially slow release fertilizer. The present invention also relates to fertilizers made by the method of the invention, especially slow release fertilizer. The method of processing organic waste to provide a slow-release fertilizer may comprise at least one hydrolysis step to provide hydrolyzed organic waste and a setting step to provide a slow release fertilizer.

20 Claims, 9 Drawing Sheets

(51) Int. Cl.
*C05F 11/00* (2006.01)
*C05G 3/00* (2006.01)
*C05D 3/02* (2006.01)
*C05F 3/00* (2006.01)
*C05F 11/08* (2006.01)

(52) U.S. Cl.
CPC ............... *C05F 9/00* (2013.01); *C05F 11/00* (2013.01); *C05F 11/08* (2013.01); *C05G 3/0041* (2013.01); *Y02A 40/203* (2018.01); *Y02A 40/205* (2018.01); *Y02P 20/145* (2015.11)

(56) References Cited

U.S. PATENT DOCUMENTS

| | | | | |
|---|---|---|---|---|
| 5,466,273 | A * | 11/1995 | Connell | C05F 3/00 71/11 |
| 5,492,624 | A * | 2/1996 | Rozich | C02F 1/722 210/605 |
| 6,461,399 | B1 * | 10/2002 | Connell | C05D 3/02 71/11 |
| 8,105,413 | B2 * | 1/2012 | Burnham | C05B 7/00 210/609 |
| 8,278,081 | B2 * | 10/2012 | Schmidt | C12P 5/023 435/167 |
| 9,586,869 | B1 * | 3/2017 | Burnham | C05B 17/00 |
| 2004/0065127 | A1 * | 4/2004 | Connell | C05F 3/00 71/15 |
| 2007/0044526 | A1 | 3/2007 | Cabello-Fuentes | |
| 2007/0163316 | A1 * | 7/2007 | Fedkenheuer | C05C 9/00 71/11 |
| 2009/0188290 | A1 * | 7/2009 | Marler | C05C 9/00 71/21 |
| 2009/0193863 | A1 * | 8/2009 | Szogi | C05B 17/00 71/21 |
| 2010/0278973 | A1 * | 11/2010 | Connell | C05F 1/005 426/53 |
| 2010/0319423 | A1 * | 12/2010 | Thomsen | C05F 3/00 71/21 |
| 2012/0247164 | A1 | 10/2012 | Dahms et al. | |
| 2015/0107319 | A1 * | 4/2015 | Vonderwell | C05F 17/009 71/10 |

FOREIGN PATENT DOCUMENTS

| | | |
|---|---|---|
| WO | 2012/135317 | 10/2012 |
| WO | 2013/108041 | 7/2013 |
| WO | 2014/001737 | 1/2014 |

* cited by examiner

ORGANIC WASTE PROCESSING

CROSS REFERENCE TO RELATED APPLICATION

This application is a national stage application filing under 35 U.S.C. § 371 of PCT International application PCT/GB2014/051883 designating the Great Britain, filed Jun. 19,2014, which claims the benefit under 35 U.S.C. § 119(a) of G.B. application Ser. No. 1311108.3, filed Jun. 21, 2013, and 1322874.7, filed Dec. 23, 2013, each of which is incorporated here by reference in its entirety for all purposes.

FIELD OF THE INVENTION

The present invention relates to methods of processing organic waste, in particular it relates to a method for making fertiliser from organic waste, especially slow release fertiliser. The present invention also relates to fertilisers made by the method of the invention, especially slow release fertiliser.

BACKGROUND TO THE INVENTION

Organic waste may be animal by-products, vegetable waste, food waste or a mixture of both.

During the processing of animals for meat production or other uses, relatively large amounts of the animal are removed, discarded and not sold on to an end user. Such discarded by-products include animal by-products such as bone, blood, gut content, wool, fur and feathers for example. Animal by-products also include animal waste such as chicken-litter, cow slurry and pig or horse manure. Vegetable waste may include kitchen waste, bedding from animals, fruit or vegetable processing waste, for example, fruit peels, sugar cane waste. This represents a significant waste of the resources that could be harnessed for useful purposes. There is also a cost involved in storing and disposing of such by-products as waste.

Various processes are known for processing organic waste. It is known to use incineration and composting to process the waste into a usable form or extract energy from waste.

Organic waste comprises valuable nutrients and there is a need for methods of processing organic waste to provide useful products. There is also a need for and environmentally friendly alternatives to conventional fertiliser for crops.

Slow release or controlled release fertilisers are particularly valuable because they release nutrients to plants over a period of time, for example several months. This means that there is less danger of toxicity to plants and of fertiliser running off the land before it is taken up by plants. Slow release fertilisers can provide a sustained supply of nutrients through a longer period of the growing season compared to fertilisers that are easily soluble and release nutrients quickly.

It is an aim of the present invention to provide a method for disposing of organic waste and a method for processing organic waste to provide a slow release fertiliser.

The present invention provides a method of processing organic waste comprising the step of mixing the organic waste with a hydrolysing composition.

The method of processing organic waste may be a method of making a slow release fertiliser.

The method may be carried out in a suitable apparatus comprising one or more vessels. The one or more vessels may be equipped with a mechanism for lifting the mixture upwards in a central region of the vessel by means of a lifting mechanism, resisting downward movement of the mixture in an outer region of the vessel by means of a heat transfer member, and transferring heat within the mixture using the heat transfer member. The vessels may also be equipped with a heating mechanism to heat the contents of the vessel.

The heat transfer member may be rotatably mounted in the vessel and may have a leading end and a trailing end. The leading end may be below the trailing end such that rotation of the heat transfer member generates a lifting force acting on the by-product, which may be arranged to resist its downward movement.

The heat transfer member may be formed form a strip of metal. The heat transfer member may be part helical.

The lifting mechanism may comprise a helical lifting member rotatable to lift the by-product. The lifting mechanism and the heat transfer member may be mounted on a common apparatus may comprise scraping means, for example one or more scrapers, arranged to scrape the inside of the vessel wall, or to scrape by-product, or other contents of the vessel, from the side wall. The scraping means may be mounted on the common rotatable support means for rotation with the heat transfer member.

The vessel wall may be cylindrical, for example having a central axis that is vertical. The vessel may further comprise heating means arranged to heat the by-product in the vessel.

The apparatus may further comprise a further processing vessel also comprising: a vessel wall; a lifting mechanism, which may be located in a central region of the vessel, arranged to lift the by-product within the vessel; a metal heat transfer member, which may extend around the lifting mechanism and may be in an outer region of the vessel, the heat transfer member optionally being rotatable around the outer region of the vessel to resist downward movement of the by-product in the outer region of the vessel and to dissipate heat through the by-product in the outer region of the vessel.

The vessel, or one of the vessels, may have an inlet connected to a supply of water. The vessel, or one of the vessels, may have an inlet connected to a supply of steam. The vessel, or one of the vessels, may have inlet means connected to a supply of acid and hydrogen peroxide.

The method may further comprise heating the mixture in the vessel.

The method may be carried out in a plant according to the invention.

The present invention may be carried out in an apparatus for processing organic waste the apparatus comprising a heating vessel having a product inlet arranged to receive the by-product, a water inlet arranged to receive water, and a steam inlet arranged to receive steam, and heating means arranged to heat the first heating vessel, a separator arranged to receive the contents of the first heating vessel and separate it into first and second components, and an acidification vessel having a product inlet arranged to receive the solid component, and acid inlet means arranged to receive acid. The acid inlet means may further be arranged to receive hydrogen peroxide.

Preferably the apparatus further comprises means to deliver a lime mix to the acidified by-product.

Preferably the apparatus further comprises means to deliver magnesium salts to the acidified by-product.

The apparatus may comprise a dryer operative to receive and dry the acidified by-product.

A by-product sizing apparatus may be provided operative to re-size the by-product into pieces below a predetermined size.

The sizing apparatus may comprise a crusher operative to crush the raw organic waste into pieces below a predetermined size.

The sizing apparatus may comprise a plurality of crushers arranged in sequence and operative to sequentially crush the raw organic waste into smaller pieces.

Preferably the sizing apparatus is operative to output pieces of less than 40 mm.

A metal detector may be provided at the inlet operative to detect any metal content in the raw organic waste and to generate a corresponding signal that is used to prevent raw organic waste entering the by-product sizing apparatus if metal content is detected.

Preferably the apparatus further comprises a pre-heating vessel operative to pre-heat the sized by-product and to deliver the sized by-product to the heating vessel.

The apparatus may further comprise a supply of at least one additive and means to deliver the additive to the further heated by-product to alter the properties of the further heated by-product.

The apparatus may comprise a pellet press or granulator operative to receive dried by-product and to press or granulate the dried by-product into pellets or granules.

The apparatus may further comprise a packaging unit or bagging machine operative to receive and package or bag the pellets or granules.

The method may comprise a step of sizing the organic waste, for example by crushing, grinding or chopping solid waste to provide suitable sized pieces. Suitable sized pieces may be less than 200 mm, less than 150 mm, less than 100 mm, less than 50 mm or less than 20 mm sized pieces.

Water may be added to the organic waste before or after sizing the organic waste.

The method may comprise a heating step. The organic waste may be heated, for example to between 70° C. and 200° C. The organic waste may be heated for between 10 and 60 minutes. The organic waste may be heated for 20 minutes at 135° C. and 3 bar pressure to provide microbiological safety. The organic waste may be heated for a time and/or temperature as specified in legislation regarding disposal of organic waste or animal waste and/or microbiological safety. The organic waste may be heated by adding steam to the organic waste, for example steam may be added in a vessel as shown at (18) or (20) in FIG. 1. The organic waste may be heated at higher than atmospheric pressure, for example in a pressurised vessel shown at (20) in FIG. 1. The organic waste may be heated by heating the vessel in which the organic waste is held. The organic waste may be heated by an exothermic reaction when a hydrolysing composition is added to the organic waste, for example in a vessel as shown at (22) in FIG. 1. The method may comprise one or more, two or more, three or more, four or more or five or more heating steps. Each heating step may be performed in a different vessel for example a heating step may be performed in each of vessels (18), (19) and (20) shown in FIG. 1. The method may comprise two or more heating steps performed at different temperatures or pressures. Heating steps may be used to remove gelatine and fat; degrade the organic waste and/or provide a microbiologically safe product from organic waste.

The heating step may be an independent step in the method of processing organic waste performed at a different time from other steps. The heating step may be performed at the same time as another step in the method, for example the hydrolysis step. Combining the organic waste with a hydrolysing composition may cause an exothermic reaction that heats the organic waste. During the heating step the organic waste may be heated using a combination of heating methods.

During the acid-peroxide/high temp/high pressure and/or digestion step a metal catalyst may be added. The metal catalyst may be any suitable metal or metal compound that is able to increase the rate of reaction with respect to breaking apart protein material such as the hydroxyproline in collagen into the constituent amino acid building blocks. The subsequently released nitrogen atoms from the peptide links are released in the form of ammonium ions. In particular these catalysts could be very useful in the dissolving of bone in acid/peroxide digestion step. The catalysts may include copper or copper compounds specifically copper II sulphate or copper II oxide, selenium or selenium compounds, titanium and or titanium compounds but specifically titanium dioxide as either a powder or a nano-powder'. Some of the catalysts, such as selenium and copper, would add benefit to the micronutrient composition of the final fertiliser product. The catalyst may be added in very small quantities, for example the mass of catalyst may be in the range of 0.1%-0.01% of the mass of undigested organic waste, for example bone paste.

The method may comprise a step of draining liquid from the organic waste. The step of draining liquid from the organic waste may be performed after the heating step. Liquid may be removed from the mixture. The liquid may comprise fat and/or gelatine which may be separated and processed separately.

The method may comprise one or more hydrolysis steps where a hydrolysing composition is combined with the organic waste. The hydrolysing composition may be for example:

a combination of an acid and hydrogen peroxide. These may be added to the organic waste together or sequentially. For example Sulphuric acid $H_2SO_4$ 50-100% (for example 95%) followed by or mixed with Hydrogen Peroxide $H_2O_2$ 5-100% (for example 30% v/v) in a ratio of 1:1 to 1:10 sulphuric acid solution:hydrogen peroxide or for example, nitric acid 37% nitric acid (70% or 1.42 specific gravity) followed by or mixed with 7% hydrogen peroxide (35% w/w);

a combination of a base and hydrogen peroxide. These may be added to the organic waste together or sequentially. For example ammonium hydroxide $NH_4OH$ and Hydrogen Peroxide $H_2O_2$ 30%;

a base, for example Potassium hydroxide KOH or sodium hydroxide NaOH; or an acid, for example Phosphoric acid H3PO4; or Hydrochloric acid HCL, Nitric Acid $HNO_3$, Sulphuric acid $H_2SO_4$.

The method may comprise one hydrolysis step, two hydrolysis steps or three hydrolysis steps. The hydrolysis steps may be performed sequentially. For example, the method may comprise an acid hydrolysis step and a base hydrolysis step performed sequentially. The method may comprise an acid or a base hydrolysis step and a hydrolysis step using acid or base and hydrogen peroxide.

The hydrolysis step may be an exothermic reaction and may cause the organic waste mixture to heat up. Heat may be removed from the organic waste mixture during this step to keep the mixture within suitable temperature limits.

If the hydrolysis step is exothermic it may contribute heat to the heating step.

Figure 1:
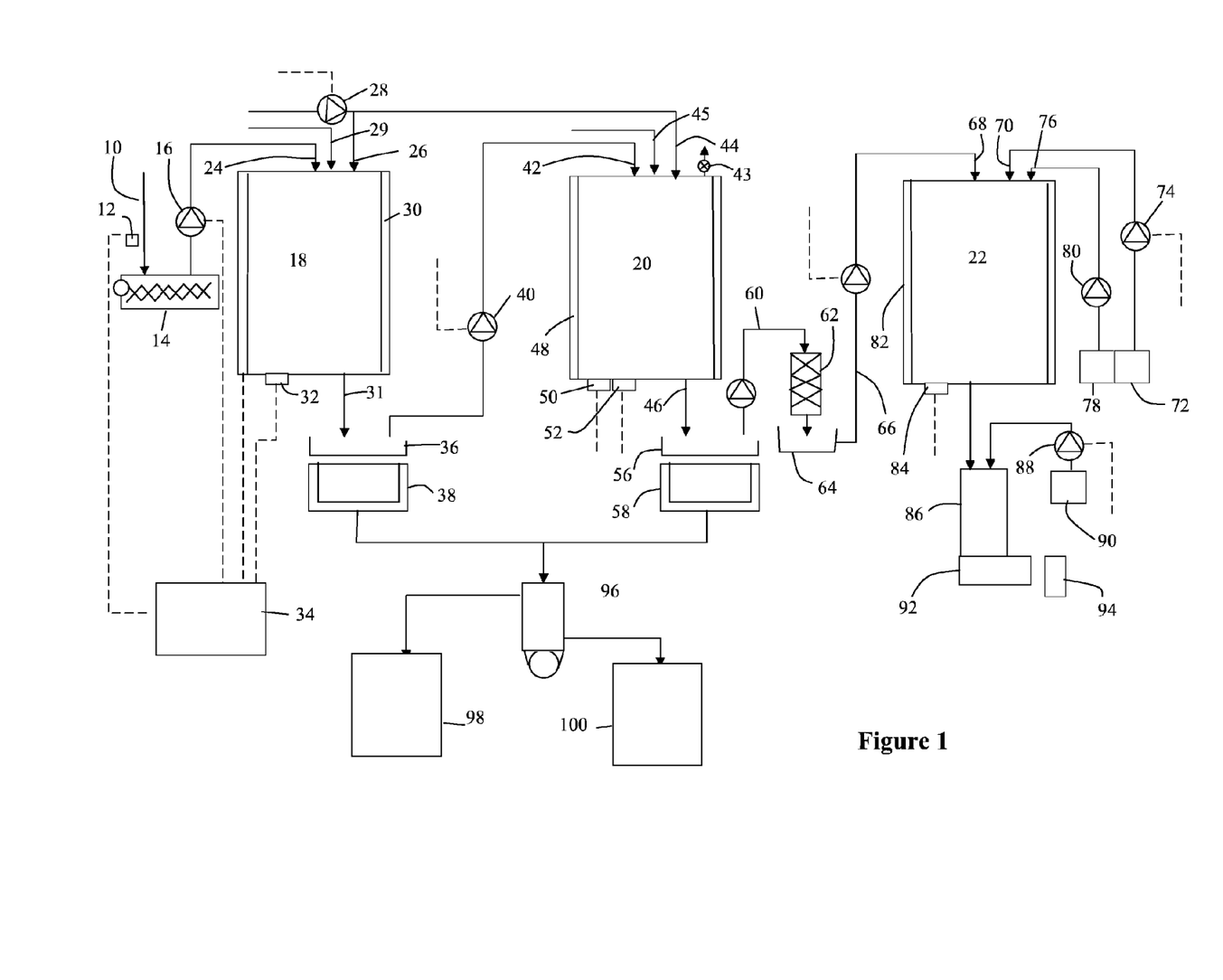
FIG. 1 is a schematic view of an apparatus for processing organic waste.

The one or more hydrolysis steps may be performed in a vessel, for example as shown at (22) in FIG. 1.

After the one or more hydrolysis steps the hydrolysed organic waste may provide an acidified hydrolysed organic waste.

The method may comprise a step of draining liquid from the organic waste. The step of draining liquid from the organic waste may be performed after the hydrolysing step. Liquid may be removed from the mixture. The liquid may comprise fat and/or gelatine and/or other components which may be separated from each other and processed separately.

The method may comprise an acidification step where the hydrolysed organic waste is combined with additional acid to bring the pH of the organic waste to an acid pH below pH 7. An acid, for example phosphoric acid, nitric acid, or sulphuric acid may be added if the organic waste mixture is not acidic after the hydrolysis step or if the organic waste mixture is not acidic enough after the hydrolysis step. The hydrolysed organic waste may be acidified to a pH between pH −2 and pH 7, between pH 1 and pH 7, between pH 2 and pH 6, between pH 3 and pH 6 or between pH 4 and pH 5. The amount of acid or base added may be enough to make the organic waste mixture slightly acid, for example pH 6.5 to pH4.

The one or more acidification or neutralization steps may be performed in a vessel, for example as shown at (22) in FIG. 1.

The method may further comprise a step of adding nutrients or minerals, for example magnesium salts to the organic waste mixture. This is advantageous because additional nutrients that are required in a fertiliser may be added to the processed organic waste so that it can be made into a fertiliser with a suitable balance of nutrients. Nutrients or minerals may be selected in order to complement the known components of the organic waste to provide nutrients or minerals that are known to be lacking in the organic waste. Nutrients or minerals may be selected to address a deficiency in the area where the processed organic waste is going to be used as a fertiliser.

The method may further comprise a step of adding ammonia and/or other basic or carbonate materials to increase the nitrogen or other minerals in the organic waste so that the final fertiliser has higher nitrogen or other minerals. For example ammonia and/or other minerals may be added to the organic waste at any point in the processing in order to increase the nitrogen content, the phosphate content or the potassium content of the final fertiliser product. Ammonia and/or other minerals may be added to the organic waste at any point in the processing in order to produce a final fertiliser product with a particular balance of nitrogen phosphate and potassium (NPK content) that is suitable for a specific soil type and/or crop type.

The method may comprise the step of drying the neutralized organic waste mixture. This may be done by a combination of heating and the addition of a dehydrating granulating mixture followed by further heating in the granule drying stage of the process. The acidified organic waste mixture may be dried until it comprises 10-12% moisture.

The method may comprise a step of setting the organic waste mixture by combining acidic, hydrolysed organic waste with a setting mixture or liming mixture. This may be any compound or composition that can form a lime mortar.

The method may comprise a re-sizing step to re-size the organic waste mixture into pieces below a predetermined size. The re-sizing step may, for example, comprise crushing, chopping or grinding the product. The product may be re-sized to pieces of less than 40 mm.

The method may further comprise adding at least one additive to alter the properties of the organic waste mixture. For example, an unpalatable ingredient may be added to deter animals from eating the fertiliser.

The method may comprise the step of pelleting or granulating the organic waste mixture after the setting step.

Granular fertilisers may be treated with hydrophobic anti-caking agents such as Kaolin by externally coating of the granules, or incorporated as part of the granulation mix; and or paraffin based additives which may be sprayed onto hot granules.

The method may further comprise a packaging step where the pellets or granules are packaged.

Organic waste may comprise, for example, waste from abattoirs, waste from meat processing or packaging, fallen stock, animal carcasses, food waste, animal excrement, for example, cow slurry, pig or cow dung, poultry litter, animal bedding, waste from the food industry, abattoir blood waste. Organic waste may be animal waste, vegetable waste or mixed animal and vegetable waste.

The method of processing organic waste may be a method of making fertiliser. The hydrolysing composition may be chosen in order to provide suitable ingredients to the fertiliser product, for example, use of nitric acid in the hydrolysing composition may provide additional nitrogen in the fertiliser product. Use of phosphoric acid in the hydrolysing composition may provide additional phosphorus in the fertiliser product. Use of sulphuric acid in the hydrolysing composition may provide additional sulphur in the fertiliser product.

The hydrolysing composition, neutralizing composition and additives may be chosen to provide a suitable level of potassium, phosphorous and nitrogen in the final fertiliser when they are combined with the organic waste.

The hydrolysing composition may also be selected because of its suitability for hydrolysing the particular components of the organic waste that it is combined with. For example a hydrolysing composition comprising a base is particularly suitable for hydrolysing organic waste comprising cellulose. A hydrolysing composition comprising acid may be particularly suitable for hydrolysing organic waste comprising bone.

Ammonium hydroxide $NH_4OH$ and Hydrogen Peroxide $H_2O_2$ 30% may be particularly suitable for hydrolysing poultry litter, pig manure, cow manure, horse manure and/or contents of intestinal tract.

The method of the present invention may comprise a hydrolysis step using potassium hydroxide KOH and then a neutralizing step using nitric acid to bring the pH close to neutral but keep the mixture slightly alkaline or slightly acidic as required for granulation into granules. The mixture may be set using lime, plaster of paris $CaSO_4 \cdot \frac{1}{2}H_2O$, Calcium carbonate $CaCO_3$, Calcium oxide CaO or Calcium hydroxide $Ca(OH)_2$.

The method according to the present invention may be a method of processing organic waste to provide a fertiliser comprising at least one hydrolysis step.

The method according to the present invention may be a method of processing organic waste to provide a fertiliser comprising at least one heating step and at least one hydrolysis step.

The method according to the present invention may be a method of processing organic waste to provide a fertiliser comprising at least one heating step, at least one hydrolysis step and at least one neutralizing step.

The method according to the present invention may be a method of processing organic waste to provide a fertiliser comprising at least one heating step, at least one hydrolysis step, at least one neutralizing step and at least one pelleting step.

The method of the present invention may be a method of processing organic waste to provide a slow-release fertiliser comprising at least one hydrolysis step to provide hydrolysed organic waste and one setting step to provide a slow release fertiliser.

The at least one hydrolysis step may comprise an acid hydrolysis step to provide an acidified hydrolysed organic waste.

The at least one hydrolysis step may comprise an acid hydrolysis step and a base hydrolysis step to produce an acidified hydrolysed organic waste.

The at least one hydrolysis step may comprise an acid hydrolysis step using any acid, for example sulphuric acid, nitric acid and/or phosphoric acid to hydrolyse organic waste and produce an acidified hydrolysed organic waste. The at least one hydrolysis step may comprise an acid hydrolysis step using sulphuric acid, to hydrolyse organic waste and produce an acidified hydrolysed organic waste.

The method may comprise an optional acidification step to make the pH of the acidified organic waste below pH 7.

The acidified hydrolysed organic waste may comprise sulphuric acid, phosphoric acid and nitric acid.

The method may comprise a step of setting the acidified hydrolysed organic waste mixture by combining acidic, hydrolysed organic waste with a setting mixture or a liming mixture. This may be any compound or composition that can form a lime mortar. The organic waste may be bonded to the lime mortar or embedded in it. The liming mixture may comprise, for example lime, calcium sulphate $CaSO_4$, Calcium carbonate $CaCO_3$, Calcium oxide CaO and/or Calcium hydroxide $Ca(OH)_2$.

The liming mixture may further comprise clay bases materials such as kaolin.

The liming mixture may set to provide a lime mortar. During the setting step the organic waste and any additives that have been added to it may become bonded to the lime mortar or set within the lime mortar to provide a slow release fertiliser.

The lime mortar may degrade when left exposed to the elements or in the soil over a period of 1 to 6 months, or over a period of more than 9 months, or over a period of 3 to 9 months, or over a period of 3 to 6 months, or over a period of 3 to 5 months or over a period of 4 to 5 months. The lime mortar may degrade more quickly in soil that is more acidic.

The composition of the setting mixture or liming mixture may be adjusted to provide a slow release fertiliser that degrades faster or slower depending on what is required. In order to adjust the time that the fertiliser takes to degrade different proportions of each of the liming mixture ingredients may be added to the acidified organic waste. For example, the liming mixture can be adjusted so that more calcium sulphate is produced in the setting step to provide a fertiliser that breaks down more slowly. More calcium sulphate may be produced by reducing the amount of lime in the liming mixture so that the excess sulphuric acid reacts with the lime to make more calcium sulphate. The liming mixture can be adjusted so that it degrades faster by including more lime in the liming mixture.

The specific conditions where the slow release fertiliser will be used may be considered when selecting the composition of the organic waste and the composition of the liming mixture. The specific conditions may be the pH of the soil, the expected rain fall, the type of crop, the nutrient requirements of the crop, the nutrient profile of the soil, the ambient temperature that the crop will grow at, the length of growing time of the crop and/or the rate at which the crop requires nutrients during particular phases of its growth.

The percentage of liming mixture compared to acidified organic waste may be adjusted to provide a fertiliser that degrades faster or slower. The percentage of liming mixture used to set the acidified organic waste may be 10% to 50%, may be 20% to 50%, or may be 30% to 50%, or may be 40% to 50% of the mass of the organic waste.

The percentage of liming mixture added compared to the amount of acidified organic waste may be adjusted to provide a fertiliser with a higher or lower neutralizing value. Neutralizing value may be the amount of base compounds in the fertiliser. For example, a higher neutralizing value may be required to partially neutralize acid soil or to provide lime to crops that prefer alkaline conditions. The percentage of liming mixture used to set the acidified organic waste may be 10% to 50% of the mass of the organic waste.

Lime mortar may comprise lime, calcium sulphate $CaSO_4$, Calcium carbonate $CaCO_3$, Calcium oxide CaO and/or Calcium hydroxide $Ca(OH)_2$, which react with water and/or acid and set to form solid lime mortar. The liming mixture may further comprise clay bases materials such as kaolin to change the properties of the lime mortar. Other components of the hydrolysed organic waste may become part of the lime mortar by chemically bonding to components of the lime mortar or by being immobilised inside the lime mortar but not chemically bonded to it. As the lime mortar degrades in soil it may release lime into the soil and may also release components of the organic waste into the soil which provide nutrients and act as a fertiliser.

The setting step may comprise admixing the acidic mixture with lime and/or one or more calcium compounds wherein the calcium compounds are able to react with water and/or acid to form lime mortar which sets the mixture to form a slow release fertiliser. One or more calcium compounds within the liming mixture may react with sulphuric acid to form calcium sulphate which sets the mixture to form part of the lime mortar of the slow release fertiliser.

The lime mortar may set the mixture to form a solid slow release fertiliser with the components of the acidic mixture bonded inside the lime mortar matrix.

The setting step may comprise admixing the acidic hydrolysed organic waste mixture with one or more selected from calcium oxide, calcium carbonate and calcium hydroxide to form a slow release fertiliser.

The setting step may comprise admixing the acidic mixture with calcium oxide and calcium carbonate to form a slow release fertiliser.

The setting step may comprise admixing the acidic mixture with calcium oxide, and calcium hydroxide to form a slow release fertiliser.

The setting step may comprise admixing the acidic mixture with calcium carbonate and calcium hydroxide to form a slow release fertiliser.

The proportions of acidic mixture, calcium oxide, calcium hydroxide and/or calcium carbonate may be adjusted so that the slow release fertiliser product is slightly alkali.

The proportions of acidic mixture, lime, calcium oxide, calcium hydroxide and/or calcium carbonate may be adjusted so that the slow release fertiliser product takes more than a month, more than two months, more than 3 months, more than 4 months, more than 5 months or more than 6 months to degrade in soil. The soil may be between pH 5 and pH7. The soil may be between pH 5 and pH 9.

The proportions of acidic mixture, calcium oxide, calcium hydroxide and/or calcium carbonate may be adjusted so that the slow release fertiliser product takes between one and 6 months, between 1 and 4 months or between 2 and 3 months to degrade in slightly acidic soil. For example the soil may be between pH 5 and pH7.

The method may comprise the step of adding one or more minerals to provide suitable nutrients in the slow release fertiliser.

The method may comprise the step of adding one or more fungicides to provide antifungal properties to the slow release fertiliser.

The method may comprise the step of adding one or more pesticides to provide pesticide properties to the slow release fertiliser.

The method may comprise the step of adding one or more herbicides to provide herbicide properties to the slow release fertiliser.

The method may comprise the step of adding one or more unpalatable compounds deter animals from eating the slow release fertiliser.

The method may comprise the step of processing the slow release fertiliser, for example by pelleting, granulating, press-forming or powderising the slow release fertiliser.

The method may comprise the step of coating the fertiliser, for example coating pellets or granules of the fertiliser, with a coating comprising one or more bacteria, fungal spores, fungicides, pesticides, herbicides, pest control agents, and/or one or more unpalatable compounds.

In a second aspect the present invention provides a slow release fertiliser provided by the method of the present invention.

In a further aspect the present invention provides a slow release fertiliser comprising a proportion of lime mortar to set the fertiliser.

The slow release fertiliser may comprise more than 10%, more than 20%, more than 30%, more than 40%, more than 50%, more than 60% or more than 70% lime mortar.

The slow release fertiliser may comprise between 10% and 70%, between 20% and 50% or between 30% and 40% lime mortar.

The slow release fertiliser may comprise lime mortar that takes between one and 6 months, between 1 and 4 months or between 2 and 3 months to degrade in slightly acidic soil. For example the soil may be between pH 5 and pH 7.

The slow release fertiliser may further comprise one or more fungicides, one or more pesticides, one or more herbicides, one or more pest control agents and/or one or more unpalatable compounds. Pellets of the fertiliser may be coated with a coating comprising one or more bacteria, fungal spores, fungicides, pesticides, herbicides, pest control agents, and/or one or more unpalatable compounds.

In a further aspect the present invention provides a composition obtained or obtainable by the method of the invention.

In a further aspect the present invention provides a fertiliser composition obtained or obtainable by the method of the present invention.

There now follows by way of example only a detailed description of the present invention with reference to the accompanying drawings, in which.

The method of the present invention may be carried out in an apparatus for processing organic waste, an example of which is set out below and in FIGS. 1 to 5.

Referring to FIG. 1, an apparatus for processing organic waste comprises an inlet 10 which receives raw organic waste. A metal detector 12 is provided at the inlet 10 to detect any metal in the raw organic waste and to generate a control signal indicative of any metal content detected. The inlet 10 feeds into a particle sizing module, which in this case is a crushing module 14, arranged to reduce the raw product to pieces of a suitable size. In this embodiment the crushing module 14 comprises a first crusher arranged to crush the raw organic waste into pieces of less than a predetermined size, said size being 150 mm in this example, and a second crusher arranged to crush the raw organic waste into smaller pieces, of less than 40 mm in this example. A conveyor 16, which may be a screw conveyor, is arranged to transfer the crushed product from the outlet of the crushing module 14 to the first 18 of three heating vessels 18, 20, 22.

The first heating vessel 18 comprises an enclosed steel container having an inlet 24 at the top through which the crushed product can be introduced, a further inlet 26, also at the top, which is connected to a water supply via a pump 28 so that water can be added to the product in the vessel 18, a further inlet 29 connected to a supply of steam, and an outlet 31 at the bottom. Flow control valves are provided in the water and steam inlets 26, 29, and the outlet 31. A heater 30 is provided around the wall of the vessel, and a temperature gauge 32 is arranged to measure the temperature in the vessel 18. A controller 34 is arranged to control the operation of the whole plant, including all the conveyors, pumps and heaters, and the inlet and outlet valves, as will be described in more detail below.

A first separation vessel 36 is arranged to receive the product from the outlet 31 from the first heating vessel, and is arranged to hold the solid product and allow liquid to drain into a collection tank 38 situated below it. A second conveyor 40 is arranged to transport the solid product from the separation vessel 36 to the inlet 42 of the second heating vessel 20.

The second heating vessel 20 is pressurized, and has a pressure vent controlled by a vent valve 43 so that the pressure in the vessel 20 can be controlled. It also has a further inlet 44 for water, a further inlet 45 for steam, and an outlet 46 at its bottom end, each with a flow control valve controlled by the controller 34. It also has a heater 48 around its side walls, and a temperature gauge 50 and pressure gauge 52 arranged to measure the temperature and pressure of the contents of the second vessel 20. These are connected to the controller 34 which is arranged to control the temperature and pressure, as well as the quantities of water, steam, and product, in the second vessel 20 as required.

A second separation vessel 56 is arranged to receive the product from the outlet 46 from the second heating vessel 20, and is arranged to hold the solid product and allow liquid to drain into a collection tank 58 situated below it. A third conveyor 60 is arranged to transport the solid product from the separation vessel 56 to a second crusher unit 62. The second crusher unit 62 is arranged to break down the solid product into pieces no larger than 2 mm.

The outlet from the crusher unit 62 is arranged to output the product into a pan 64, which may be arranged to pre-heat the product prior to it being received in the third heating vessel 22. A further conveyor 66 is arranged to transport the product from the pan 64 to the inlet 68 of the third heating vessel 22.

The third vessel 68 also has a further inlet 70 at its top end connected to a source 72 of acid via a pump 74, and a further inlet 76 connected to a source 78 of hydrogen peroxide, via pump 80. These are controlled by the controller 34 so that acid and hydrogen peroxide can be added into the vessel 22 in the required amounts and rates and at the required time. The third vessel also has a heater 82 and a temperature gauge 84 connected to the controller 34. An outlet 84 at the bottom end of the vessel 22 is connected to a neutralization vessel 86 which is arranged to receive the product from the third heating vessel 22, and also arranged to receive an alkaline additive, in this embodiment a lime mix, via a conveyor 88, from an alkaline additive source 90, under the control of the controller 34.

The final neutralized product is in the form of a paste and an extruder 92 is arranged to receive this product from the neutralization vessel 86 and extrude it into pellets, and a packaging module 94 is arranged to receive the extruded pellets and package them for transport away from the plant.

Each of the liquid collection vessels 38, 58 has an outlet that is connected to a separator in the form of a centrifuge 96 which is arranged to separate out the lighter and heavier components of the liquid. The lighter components will generally comprise fats, and the heavier components generally comprise gelatine, and these components are collected in separate collection vessels 98, 100.

Operation of the plant will now be described with particular reference to the treatment of bone, although it will be appreciated that it can be used for a wide variety of other waste products.

Raw bone is introduced into the crusher module 14 where it is crushed into pieces no larger than 40 mm. From there it is transferred into the first vessel 18.

The controller 34 is arranged to monitor the amount of product entering the vessel 18, for example using a load cell to measure its weight, and to stop the transfer of product when a specified amount has entered the vessel. The controller 34 is also arranged to control the introduction of water and steam into the vessel 18, and to heat the vessel 18 to the required temperature. The bone and water mixture is heated to approximately 95° C. to form an organic waste slurry which is then transferred to the separation vessel 36.

In the separation vessel 36, liquid drains from the slurry into the collection tank 38 while the slurry is transferred along the vessel. The drier slurry is then transferred via the conveyor 40 to the second heating vessel 20. The amount of slurry introduced into the second vessel 20 is controlled by the controller, for example using weighing cells to weigh the amount added, and then controlled amounts of water and steam are added by controlled operation of the inlet valves. The second vessel 20 is then heated up to about 135° C., and the vent valve 43 closed so that the pressure increases to about 5 bar. This temperature and pressure is maintained for about twenty minutes.

At the end of the treatment in the second vessel 20, the vent valve 43 is opened to reduce the pressure in the vessel, and the outlet 46 is opened to allow the product, which is still in the form of a slurry, to empty into the second separation vessel 56. From that vessel 56, liquid drains into the second collection vessel 58, and the solid component of the slurry is transferred via conveyor 60 into the second crusher unit 62, where it is crushed to a particle size of about 2 mm and transferred to the pre-heating vessel 64, where it is pre-heated.

From the pre-heating vessel 64 the solid product is transferred via conveyor 66 into the third heating vessel 22 via the conveyor 66 and the inlet 68. Again the amount of product introduced is controlled, and also sulphuric acid and hydrogen peroxide are added in controlled amounts via the inlets 70, 76. The reaction in the vessel 22 is exothermic and the temperature rises to about 95° C., and then falls off when the reaction is complete. This heat and the acid and hydrogen peroxide kills any disease or bacteria in the product, and also oxidises any carbon in the product resulting in an inorganic product which is suitable for use as a fertiliser.

When the acidification step is complete, the outlet 22 from the third vessel 22 is opened and the product transferred to the neutralization vessel 86, to which lime mix is added in controlled quantities in order to increase the pH of the mixture to neutralize the product. The lime mix may comprise a mixture of chalk and lime, or quick lime for example. The lime mix may also comprise additives to alter the properties of the mix, such additives for example comprising selected macro/micro nutrients. The lime mix, and/or the additives, can be varied as required to deliver the required fertilizer properties. The lime mix causes an exothermic reaction. This serves to at least partially dry the acidified organic waste.

The increased pH mixture, which is typically in the form of a paste, is then dried if necessary, and passed into the extruder 92, from which it is extruded as pellets or granules, and packaged at packaging module 94 for transport.

The liquid from the collection vessels 38, 58 is separated in the centrifuge 96, with fat being transferred to fat storage tank 98 and gelatine to the gelatine storage tank 100.

The third heating vessel 22 may also comprise additive inlets arranged to deliver further additives to the slurry. These additives can be of any suitable ingredient to adjust the mineral or nutritional content of the solid slurry particles to suit a particular use or location of use. Thus the additives can be controlled to alter the macro/micro nutrient bases of the solid slurry particles to suit different soil or ground conditions for example, or to provide optimum nutrition for a particular type of crop.

Figure 2:
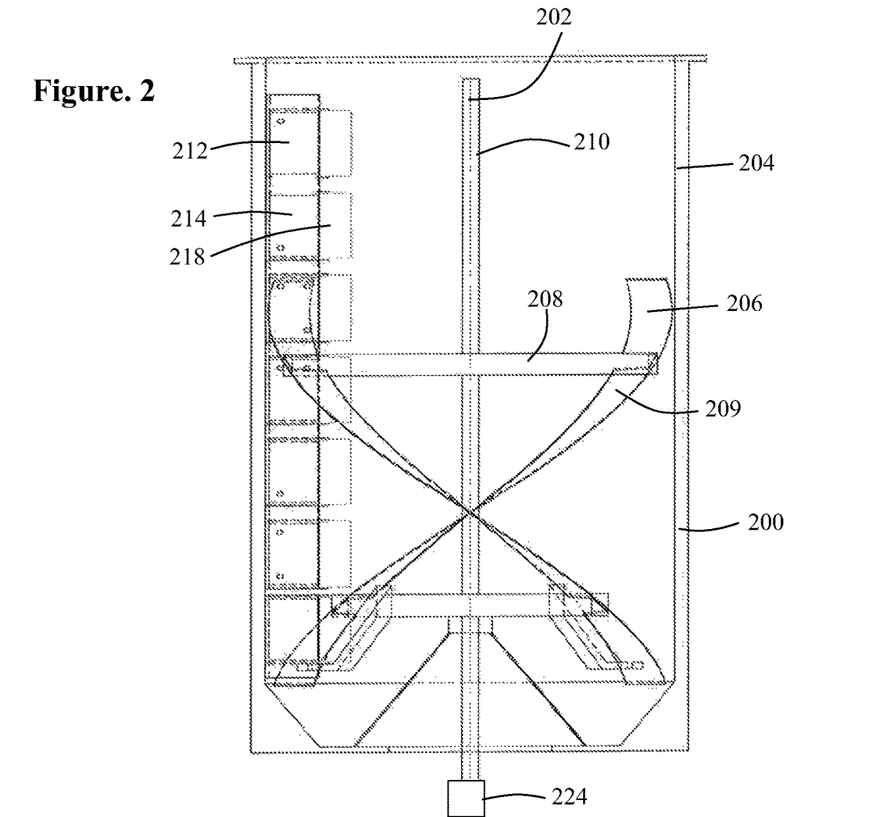
FIG. 2 is a cut-away side view of a heating vessel forming part of the plant of FIG. 1.
Figure 3:
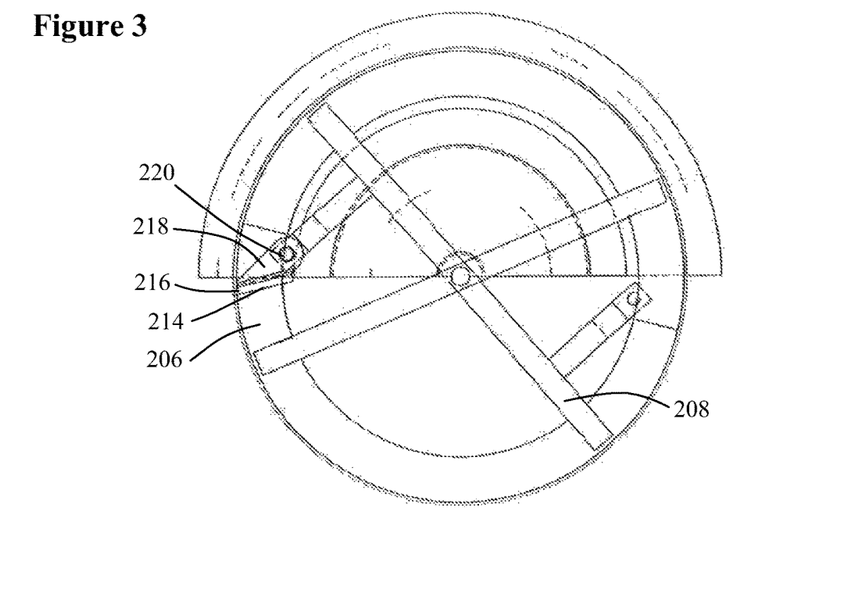
FIG. 3 is a plan view of the vessel of FIG. 2.

Referring to FIGS. 2 and 3, the first heating vessel 18 comprises a cylindrical steel body 200, about 1.25 m high and 750 mm in diameter, arranged so that its central axis 202 and curved side walls 204 extend vertically. A pair of part-helical heat transfer blades 206 are mounted by means of cross members 208 on a central rotatable shaft 210 which is located on the central axis 202. Each of the heat transfer blades 206 is formed of a strip of sheet metal 209 about 15 mm wide, which is formed into a part-helix shape extending around the outer part of the vessel close to the side wall 204 but spaced slightly from it. The blades each extend from a point about two thirds of the way up the side of the vessel, down to close to the bottom of the vessel, and through half a turn around the central axis. The two blades 206 are diametrically opposite each other, so that they extend around opposite sides of the vessel.

A pair of scrapers 212 are also supported on the cross members 208. Each scraper 212 comprises a flat scraper blade 214 extending vertically down the side wall 204 of the vessel with an outer scraping edge 216 just clear of the side wall 204. Each of the scraper blades 214 is supported on a set of support brackets 218, which in turn are supported on a vertical support pole 220 which extends vertically between the cross members 208 near their outer ends.

Figure 4:
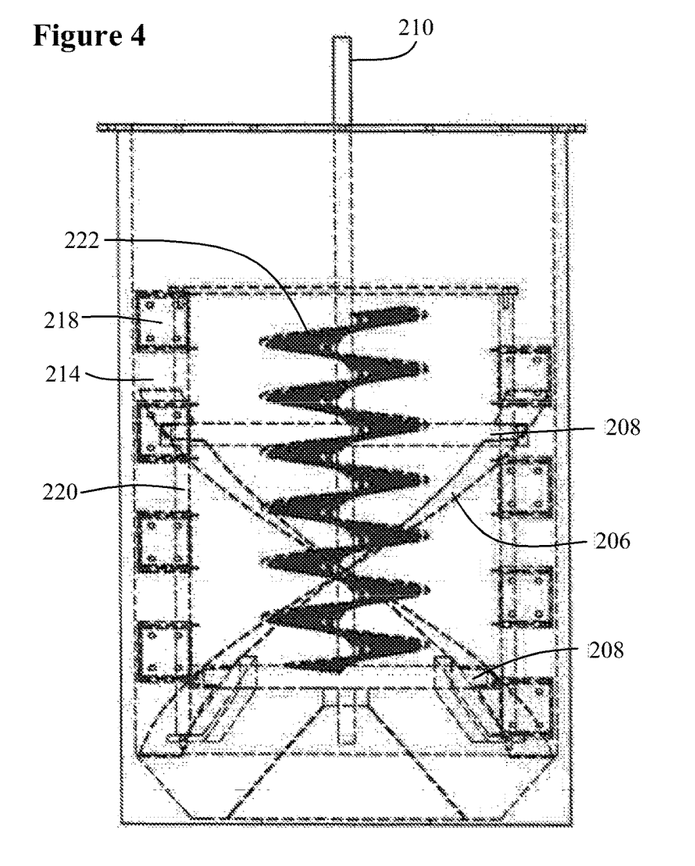
FIG. 4 is a cut-away side view of a heating vessel of FIG. 2 with further components shown.
Figure 5:
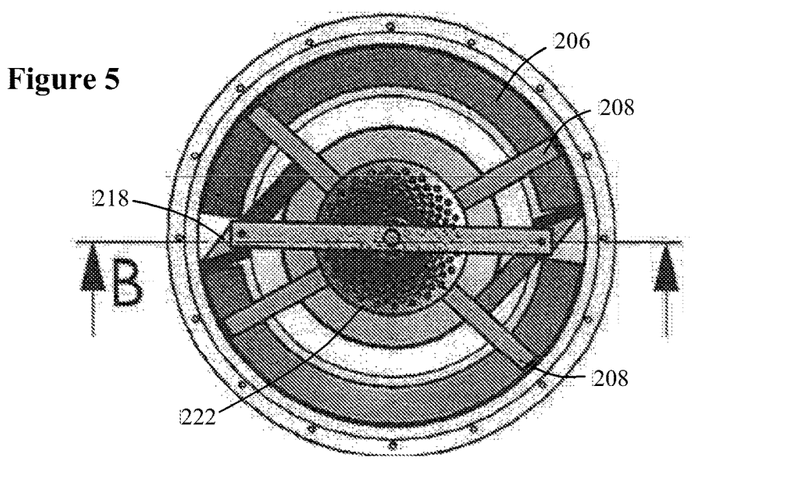
FIG. 5 is a plan view of the vessel of FIG. 4.

Referring to FIGS. 4 and 5, an inner helical lifting flight 222 is also mounted on the shaft 210. The lifting flight 222 is formed of a flat strip of metal 224 about 100 mm wide, formed into a helix centred on the shaft 210, and turning through about seven turns. The top of the lifting flight 222 is about level with the top of the heat transfer blades 206 and the bottom of the lifting flight 222 is slightly above the bottom of the heat transfer blades 206. The turning sense of the lifting flight 222 is the same as both of the heat transfer blades 206. A motor 224 is arranged to rotate the shaft 210, so that the lower end of the lifting flight forms a leading end and the upper end of the lifting flight forms a trailing end, and the lifting flight provides lift in the central part of the vessel 18 close to the central axis 202. At the same time, the lower ends of the heat transfer blades 206 form leading ends and the upper ends of the heat transfer blades form trailing ends, and the heat transfer blades also provide a small amount of lift, or in fact resistance to downward flow, in the outer part of the vessel closer to the outer wall 204. As the shaft rotates, the scrapers 212 move around the wall 204 of the vessel, scraping from the wall any of the by-product or other contents of the vessel that may have accumulated on the wall.

The central shaft 210 is rotated as the product is introduced into the vessel 18 through the inlet 24, the water is introduced through the inlet 26, this forms a slurry, and the steam is introduced through the inlet 29 which helps to heat the slurry. As the heater 30 heats up the contents of the vessel 18 and the steam is injected into it, the central lifting flight 222 causes a general upward flow of the mixture in the central area of the vessel. The mixture then moves outwards at the top of the vessel 18 and cascades downwards in the outer region of the vessel 18 close to the wall 204. The rotating heat exchange blades 206 provide some resistance to the downward flow, and therefore mix the mixture, but also help to conduct heat through the mixture quickly allowing it to be heated quickly to the required temperature. This helps to reduce the time required for the heating step carried out in the first heating vessel 18.

The second vessel 20 has the same mixing and heat exchange mechanism as the first vessel 18 as shown in FIGS. 2 to 5. In this vessel the heating process is similar to the first vessel, though at increased pressure, and the heat exchange coils and the lifting flight serve to distribute heat from the heater and steam throughout the vessel in a similar way. Similarly the third vessel 22 also has the same mixing and heat exchange mechanisms as shown in FIGS. 2 to 5. In this case the heat is generated by the exothermic reaction in the vessel. However, rapid heat dissipation is still helpful to ensure that the temperature remains approximately equal throughout the vessel, and that the reaction proceeds at about the same rate throughout the vessel.

It will be appreciated that various modifications can be made to the embodiment described above, and that the design of the heating vessel or vessels can be varied as appropriate for the process and products to be treated. For example, the two heat transfer blades could be replaced by one continuous helical coil, or more than two blades. Also the blades may not be strictly part-helical. For example the angle of the blade or blades to the vertical may vary along its length. Similarly the lifting flight may be of a different shape, or may be rotated independently of the heat transfer coils. Indeed a different type of lifting mechanism may be provided which is not a helical flight.

A number of pilot studies, described in the examples below, were performed to assess the effectiveness of different compositions for use in the hydrolysis step of the present method. The hydrolysis step may take place in one of the reaction vessels, for example vessel (22) in FIG. 1. The pilot studies were mostly done on a small scale but may be scaled up and the method may be performed on large quantities of organic waste, for example in an apparatus as shown in FIG. 1. The inlets for acid and hydrogen peroxide described in relation to FIG. 1 may alternatively be used to add other ingredients for the hydrolysis and neutralization steps.

Example 1 Acid and Hydrogen Peroxide

Bone Paste

The preferred ranges of the temperature and reaction times.

Operating temperature range: Start temp of bone paste 10° C. to 100° C. giving an end temp after the hydrolysis step of 100° C. to 200° C.

Preferred temp for process: Start temperature 50-90° C.-end temp 130-170° C.

Ratio of wet bone paste to acid to hydrogen peroxide by mass 5-20:5:1 (wet bone:acid:peroxide), for example 13.5: 5:1 (wet bone:acid:peroxide).

For example the ratio may be: 1000 kg bone paste (wet) to 370 kg of 95% sulphuric acid to 74 kg of 30% hydrogen peroxide.

Treatment time Broad range—1 min to 30 mins, for example, the treatment time may be 5-10 mins.

The amounts of acid and hydrogen peroxide—Broad Range—1:1 to 1:10 Concentrated sulphuric acid to hydrogen peroxide solution.

Preferred ratio is 1:5 concentrated sulphuric acid to hydrogen peroxide for bone digestion but will vary for other waste streams.

Concentrated sulphuric acid used is 95% (1.83 g/ml) but this could work over a range of 50-100%.

Concentrated hydrogen peroxide used is 30% w/v (weight to volume) but concentrations between 5-100% w/v although greater than 30% can carries an explosion risk.

Example 2 Base and Hydrogen Peroxide

Base Peroxide

Broad range of concentrated ammonium hydroxide, and/or potassium hydroxide and/or sodium with hydrogen peroxide from 1:1 to 1:10 using 0.880 sg (specific gravity) ammonium hydroxide (ammonia solution) and 30% hydrogen peroxide solution.

Preferred mixture 3:1 of 0.880 sg ammonia solution to 30% hydrogen peroxide solution for the purpose of dissolving for example poultry litter, pig manure, cow slurry, cow manure, horse manure, contents of intestinal tract material from abattoir waste etc.

Example 3 Hydrolysis of Blood

Overview—blood contents are hydrolysed using sodium hydroxide or potassium hydroxide. The resulting solution is neutralized using nitric acid or sulfuric acid forming a potassium nitrate, sodium nitrate, sodium sulphate or potassium sulphate solution depending on the acid and base used solution containing the dissolved, heat treated, hydrolysed blood components.

Method:

To 100 g of congealed blood add 30 g of water and bring to the boil (water not required if blood is fresh and uncongealed). NB—frozen blood used can be seen melting in FIG. 1.

Hydrolysis: Add 10 g of Potassium Hydroxide pellets KOH (solid, form preferred) or 7 g of sodium hydroxide (solid form preferred) and stir for two minutes until deep red solution forms—very exothermic reaction. The product of this reaction is shown in FIG. 2.

Neutralisation: Add 16 g of 70% 1.42 specific gravity nitric acid to neutralize the potassium hydroxide (concentrated) although a dilute nitric acid solution would suffice—very exothermic. The resulting mixture is shown in FIG. 3.

The resultant mixture is then treated with further nitric acid to achieve the desired pH for granulating—this could be acidic or alkaline.

Solution of potassium nitrate containing dissolved, hydrolysed blood. If a small amount of solid precipitates from the blood it may be separated and hydrolysed/oxidised by a small, additional dose of nitric (or sulphuric) acid and hydrogen peroxide in a ratio of 5:1 before recombining with original solution for pasting or setting.

The neutralized hydrolysed blood may be blended with other soluble ingredients and the resultant solution sold as a liquid fertiliser or the neutralized hydrolysed blood may be granulated and sold as a solid granular form after setting using plaster of paris (CaSO4.½H2O) FIG. 4 left or Calcium carbonate/oxide/hydroxide CaCO3/CaO/Ca(OH)2 FIG. 4 right.

Example 4

Acid hydrolysis using phosphoric acid (other acids could be used—nitric acid or sulphuric acid) followed by alkaline hydrolysis using potassium hydroxide or sodium hydroxide—resultant mixture neutralized using nitric acid or sulphuric acid.

Phosphoric acid increases the phosphorus content (P) and hydrolyses cellulose content. Nitric acid increases the N content.

Potassium hydroxide increases the K content and hydrolyses bulk content. Nitric acid neutralizes the potassium hydroxide or sodium hydroxide forming potassium nitrate or sodium nitrate and increases the N content.

Approximate ratios by mass—42 (chicken litter):100 (water):2 (phosphoric acid):6.6 (potassium hydroxide) or 4.7 sodium hydroxide:8.0 (nitric acid).

Overview 63 g of chicken litter and bedding is shown in FIG. 5.

Figure 6:
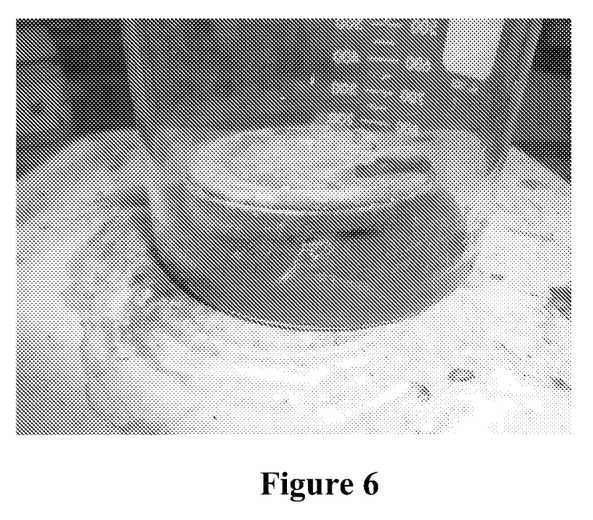
FIG. 6 shows a beaker containing 95 g of congealed frozen blood and 30 g of water.
Figure 7:
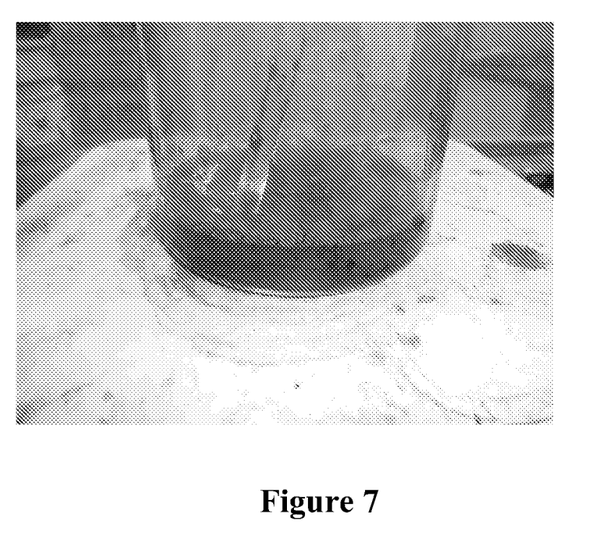
FIG. 7 shows a view of the hydrolysis and heating stage being performed on 95 g of blood with 30 g of water. 10 g of potassium Hydroxide pellets have been added and the mixture was stirred for two minutes to form a deep red solution. This reaction is very exothermic and so hydrolysis and heating happen at the same time.
Figure 8:
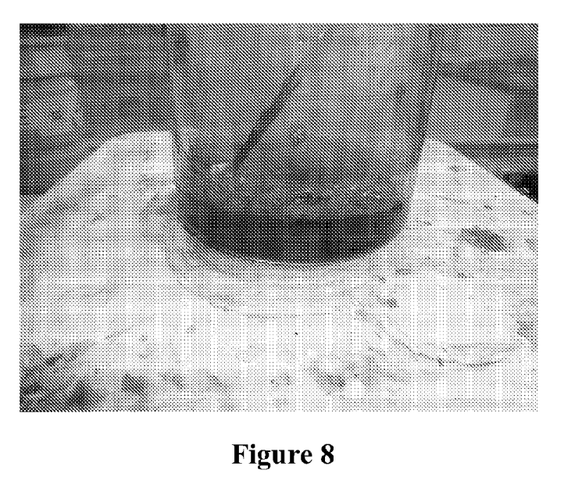
FIG. 8 shows the mixture of FIG. 7 with 8 g of 70% (1.42 specific gravity) nitric acid added to neutralize the potassium hydroxide this step is also very exothermic and is the neutralization step and a heating step at the same time. The resulting mixture is an alkaline solution of potassium nitrate containing dissolved hydrolysed blood.
Figure 9:
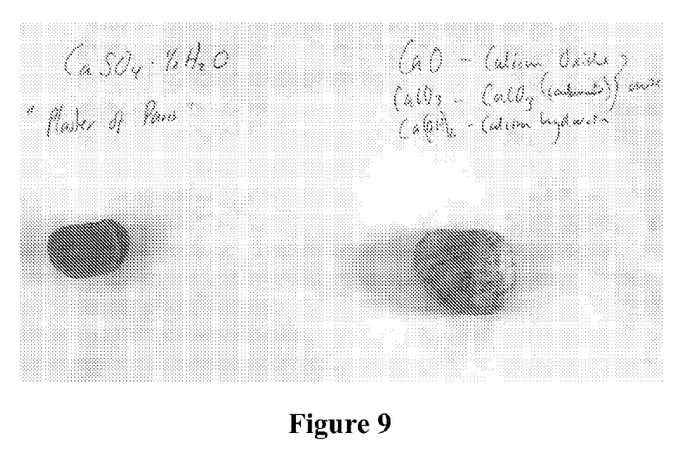
FIG. 9 shows a view of the solid set product that results when the mixture shown in FIG. 8 is combined with $CaSO_4 \cdot \frac{1}{2}H_2O$ (left hand side) or with $CaO$, $CaCO_3$ and $Ca(OH)_2$.

Addition of 150 ml of water followed by 'blending' to form a suitable, workable paste shown in FIG. 6.

Acid hydrolysis: —high-heat stage of process. 3 g (0.0306 mole) of H3PO4 (Orthophosphoric acid 1.75 specific gravity) or 2.75 g 70% nitric acid is added to drop pH to pH 3-4 and mixture brought to the boil (high heat stage of process).

Alkaline hydrolysis—in heliotherm stage. First the phosphoric acid is neutralized by potassium hydroxide:

$$H3PO4+3KOH \rightarrow Na3PO4+3H2O$$

3.00 g of phosphoric acid (0.0306 mol) requires 0.0918 mol of potassium hydroxide=5.14 g then an addition 5 g of KOH is required to facilitate the increase in pH to 14 and hydrolyse fat/protein/lipids/nucleic acids etc (total 10 g of KOH)—lots of heat evolved NaOH could also be used (less required—7.14 g).

Neutralisation—still in heliotherm stage.

Neutralisation using 17 g of 70% (1.42 specific gravity) nitric acid.

Resultant mixture is an alkaline, sweet (molasses type smell) brown paste containing potassium nitrate, potassium phosphate and all the components of chicken litter suitable for plant uptake.

Figure 10:
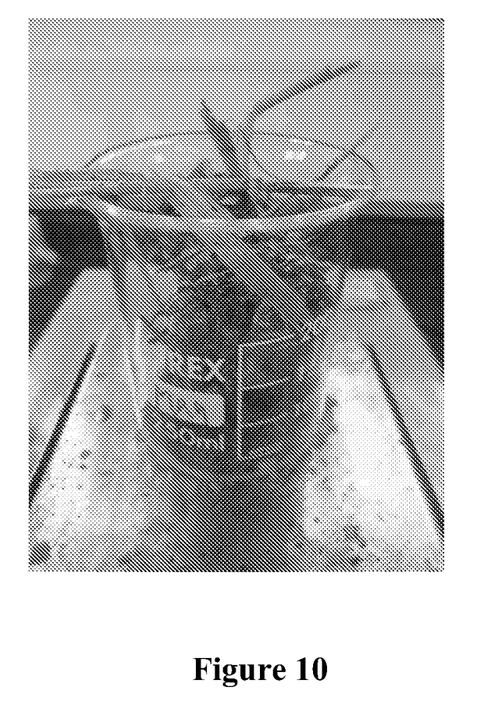
FIG. 10 shows a view of 63 g of chicken litter and bedding.
Figure 11:
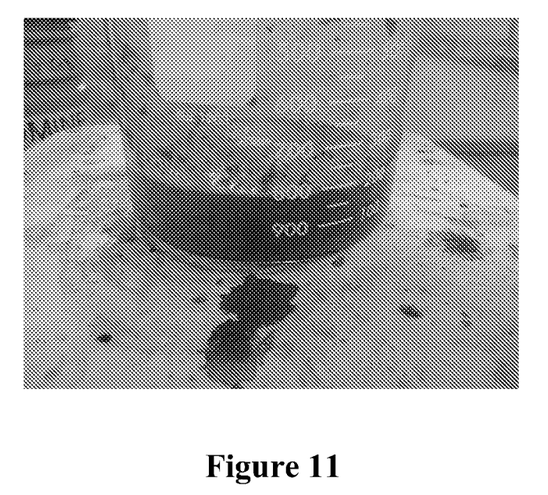
FIG. 11 shows a view of the 63 g of chicken litter and bedding mixed with 150 ml and blended to form a workable paste.
Figure 12:
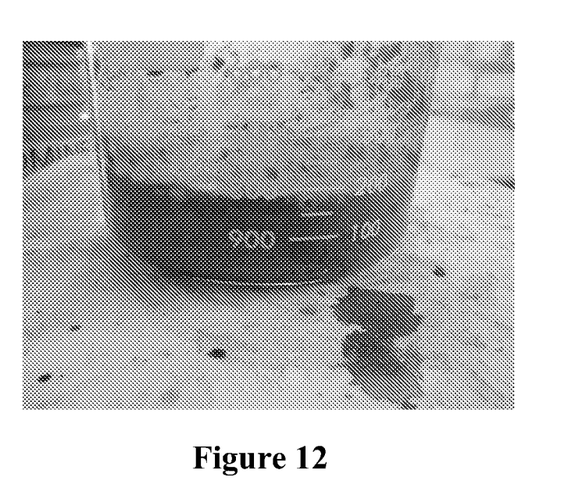
FIG. 12 shows a view of the blended mixture shown in FIG. 11 with 3 g (0.0306 mole) of H3PO4 (orthophosphoric acid (1.75 specific gravity) added and the mixture brought to the boil. This is the heating stage and a first hydrolysis stage (acid hydrolysis) done at the same time.
Figure 13:
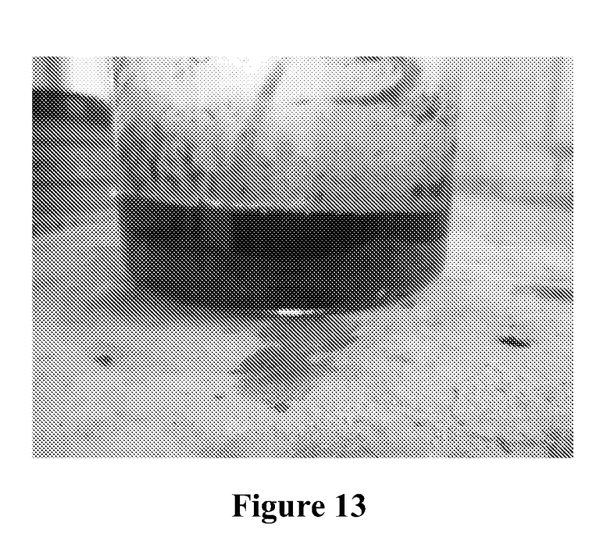
FIG. 13 shows a view of the mixture in FIG. 12 with 0.0918 mol of potassium hydroxide (5.14 g) added to neutralize the acid, then 5 g more potassium hydroxide added to increase the pH to 14 and hydrolyse fat, proteins, lipids and nucleic acids, this stage is highly exothermic and is therefore a second hydrolysis step (base hydrolysis) performed at the same time as a heating step.
Figure 14:
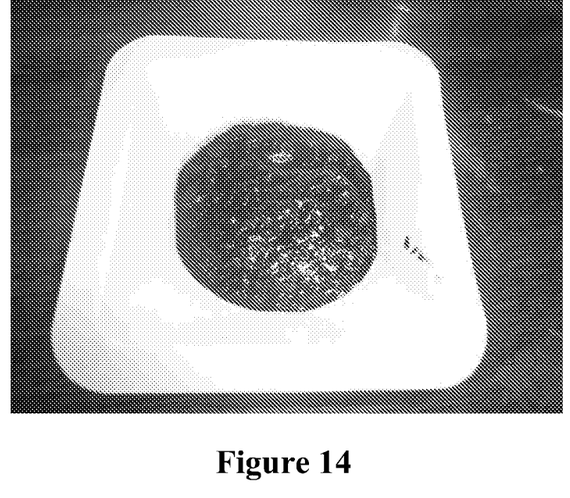
FIG. 14 shows a view of the resulting mixture after pH of the mixture shown in FIG. 13 is neutralized using 8 g of 70% (1.42 specific gravity) nitric acid.
Figure 15:
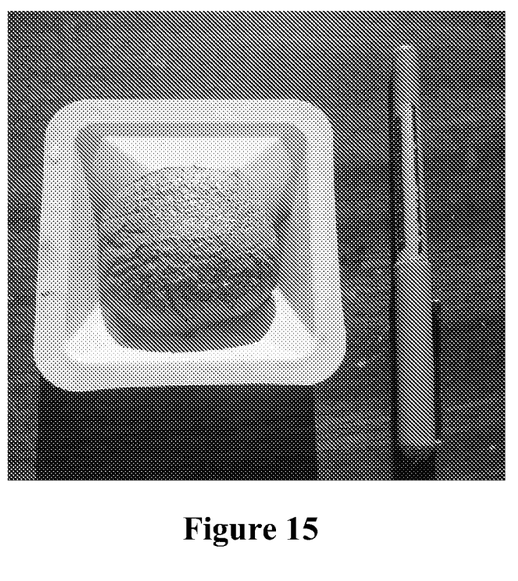
FIG. 15 shows a view of the mixture shown in FIG. 14 after addition of calcium carbonate, calcium hydroxide and calcium oxide to produce a solid pellet.
Figure 16:
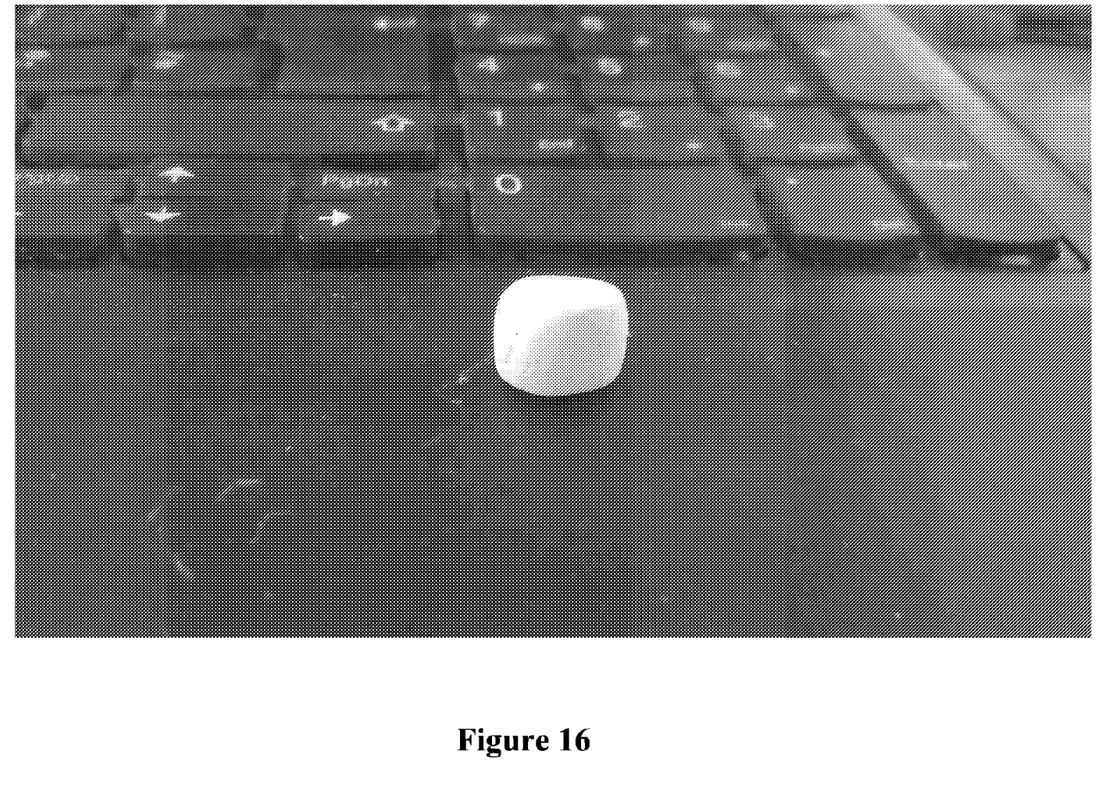
FIG. 16 shows a pellet of fertiliser made from chicken litter using a process of the present invention.

Addition of calcium carbonate/hydroxide/oxide/calcium sulphate heptahydrate mix to produce the solid pellet form is shown in FIG. 10.

Sodium hydroxide is useful for the hydrolysis of blood or chicken litter followed by neutralization using sulphuric acid. For example 100 g of blood requires 5 g of sodium hydroxide at around 90° C. to hydrolyse, followed by neutralization using concentrated sulphuric acid 3.6 ml (6.63 g) and then adjustment of pH to desired level.

The present invention may be further described in the following numbered paragraphs:

1. A method of processing organic waste comprising one or more step of combining the organic waste with a hydrolysing composition.
2. The method according to paragraph 1 further comprising a heating step.
3. The method according to paragraph 2 wherein the organic waste is heated to between 70° C. and 200° C.
4. The method according to paragraph 2 or paragraph 3 wherein the organic waste is heated for between 10 and 60 minutes.
5. The method according to any one of the preceding paragraphs further comprising the step of removing liquid comprising fat and/or gelatine from the organic waste.
6. The method according to any one of the preceding paragraphs wherein the hydrolysing composition comprises: an acid and hydrogen peroxide; a strong base and hydrogen peroxide; a base; an acid; or hydrogen peroxide.
7. The method according to any one of the preceding paragraphs further comprising a sizing step wherein the organic waste is sized to pieces less than 50 mm.
8. The method according to any one of the preceding paragraphs further comprising a neutralization step, wherein acid or base is added to the mixture to bring the pH near to neutral.
9. The method according to any one of the preceding paragraphs further comprising a step of adding minerals or nutrients to the mixture.
10. The method according to any one of the preceding paragraphs further comprising drying the organic waste mixture.
11. The method according to any one of the preceding paragraphs further comprising adding a setting agent such as calcium carbonate, calcium hydroxide, calcium sulphate hemihydrate and/or calcium oxide to the organic waste in a quantity suitable to set the mixture.
12. The method according to any one of the preceding paragraphs further comprising the step of re-sizing the set organic waste into pieces of less than 40 mm.
13. The method according to any one of the preceding paragraphs further comprising adding one or more unpalatable ingredients to the organic waste mixture.
14. The method according to any one of the preceding paragraphs further comprising a step of pelleting or granulating the organic waste mixture.
15. The method according to any one of the preceding paragraphs wherein the method of processing organic waste is a method of producing fertiliser.
16. An organic waste composition obtained by the method according to any one of the preceding paragraphs.
17. A fertiliser composition obtained by the method of any one of the preceding paragraphs.

The invention claimed is:

1. A method of processing organic waste to provide a slow-release fertiliser comprising at least one digesting step to provide dissolved organic waste and a setting step to provide a slow release fertiliser,
   wherein said digesting step comprises combining the organic waste with a metal catalyst, concentrated sulfuric acid and concentrated hydrogen peroxide and heating to a temperature between 70 °C. and 200°C., wherein the sulfuric acid and hydrogen peroxide are added to the organic waste in a ratio of 5-20:5:1 organic waste:sulfuric acid:hydrogen peroxide, and wherein said catalyst is titanium dioxide, copper or a copper compound; and,
   wherein the setting step comprises combining the dissolved organic waste with a liming mixture that can form a lime mortar and comprises calcium carbonate.
2. The method according to claim 1, wherein said sulfuric acid has a concentration of to 50 to 100%.
3. The method according to claim 1, wherein the liming mixture further comprises lime, calcium sulphate, calcium oxide and/or calcium hydroxide.
4. The method according to claim 1, wherein the liming mixture further comprises clay base materials.
5. The method according to claim 1, wherein the liming mixture sets to provide a lime mortar with the acidified dissolved organic waste bonded to the lime mortar or set within the lime mortar to provide a slow release fertiliser.
6. The method according to claim 1, wherein the liming mixture is composed to provide a lime mortar that degrades, when left exposed to the elements or in the soil, over a period of 1 to 9 months.
7. The method according to claim 1, wherein the mass of liming mixture compared to the mass of acidified dissolved organic waste is adjusted to provide a fertiliser that degrades faster or slower and/or to provide a fertiliser with a higher or lower neutralising value.
8. The method according to claim 7, wherein the mass of said liming mixture is 10% to 50% of the mass of the acidified dissolved organic waste.
9. The method according to claim 1 further comprising the step of adding one or more minerals at any stage in the method to provide nutrients in the slow release fertiliser.
10. The method according to claim 1 further comprising the step of adding one or more fungicides, pesticides, herbicides or unpalatable compounds to provide desirable properties to the slow release fertiliser.
11. The method according to claim 1 further comprising the step of processing the slow release fertiliser by pelleting, granulating, press-forming or powderising the slow release fertiliser.
12. The method according to claim 1, further comprising the step of coating the fertiliser with a coating comprising one or more of bacteria, fungal spores, fungicides, pesticides, herbicides, pest control agents, or unpalatable compounds.
13. The method of claim 1, wherein said hydrogen peroxide has a concentration of 30-100%.
14. The method of claim 1, wherein the ratio of sulfuric acid to hydrogen peroxide is between 1:1 and 1:10.
15. The method of claim 1, wherein the copper II compound or titanium dioxide is added at 0.1%-0.01% of the weight of organic waste.
16. The method of claim 1, wherein the method comprises a sizing step wherein said organic material is crushed, ground or chopped before the digesting step.
17. The method of claim 1, wherein the method further comprises a step of concentrating the dissolved organic waste by evaporation where 10-40% of the water is removed by evaporation after the digesting step.
18. The method of claim 1, further comprising a drying step to remove water after the setting step.
19. The method of claim 1, wherein the pH of the dissolved organic waste is increased by mixing it with chalk or lime.
20. The method according to claim 4, wherein the clay base materials include kaolin.

* * * * *

UNITED STATES PATENT AND TRADEMARK OFFICE
CERTIFICATE OF CORRECTION

PATENT NO. : 10,087,115 B2
APPLICATION NO. : 14/900337
DATED : October 2, 2018
INVENTOR(S) : Bruce William Palmer Page 1 of 1

It is certified that error appears in the above-identified patent and that said Letters Patent is hereby corrected as shown below:

On the Title Page

Please change the Assignee to: Elemental Digest Limited, Exeter Devon (GB)

Signed and Sealed this
Thirty-first Day of August, 2021

Drew Hirshfeld
*Performing the Functions and Duties of the*
*Under Secretary of Commerce for Intellectual Property and*
*Director of the United States Patent and Trademark Office*